(12) United States Patent
Seymour (10) Patent No.: US 9,853,853 B2
(45) Date of Patent: Dec. 26, 2017

(54) FACILITATING SHARING OF SETTING DATA IN BINARY FORMAT FOR ELECTRONIC DEVICE

(71) Applicant: Yamaha Corporation, Shizuoka-ken (JP)

(72) Inventor: L P H K Seymour, London (GB)

(73) Assignee: Yamaha Corporation, Hamamatsu-Shi (JP)

( * ) Notice: Subject to any disclaimer, the term of this patent is extended or adjusted under 35 U.S.C. 154(b) by 288 days.

(21) Appl. No.: 13/871,864

(22) Filed: Apr. 26, 2013

(65) Prior Publication Data
US 2013/0290567 A1 Oct. 31, 2013

(30) Foreign Application Priority Data
Apr. 27, 2012 (JP) .................................. 2012-102829

(51) Int. Cl.
G06F 15/16 (2006.01)
H04L 29/08 (2006.01)
G10H 1/00 (2006.01)

(52) U.S. Cl.
CPC ..... *H04L 29/08756* (2013.01); *G10H 1/0075* (2013.01); *H04L 67/2823* (2013.01)

(58) Field of Classification Search
CPC ...................................................... H04L 29/08
USPC ....................................................... 709/246
See application file for complete search history.

(56) References Cited

U.S. PATENT DOCUMENTS

| 2003/0000368 A1 | 1/2003 | Isozaki |
| 2005/0243747 A1* | 11/2005 | Rudolph ....................... 370/282 |
| 2006/0031756 A1 | 2/2006 | Dirstine |

(Continued)

FOREIGN PATENT DOCUMENTS

| GB | 2 342 831 A | 4/2000 |
| JP | 2002-372970 A | 12/2002 |

(Continued)

OTHER PUBLICATIONS

Design of an Architecture for a MIDI based Music e-Tutor, Stanly Mammen, Sri Krishna College of Engineering, IEEE 2010.*

(Continued)

*Primary Examiner* — Emmanuel L Moise
*Assistant Examiner* — Marie Georges Henry
(74) *Attorney, Agent, or Firm* — Morrison & Foerster LLP (57) ABSTRACT

An electronic device has setting data in binary format formulated according to a specific format suitable to realize a function in the device. In order to share the setting data in binary format with another device, the electronic device converts the setting data in binary format to setting data in text format and transmits (uploads) a set of text data containing the converted setting data in text format to a network communication service provided on a server through a communication network. The network communication service may be a conventional communication service of a web site capable of handling text data. Another electronic device can access the network communication service through communication network, receive (download) the set of text data, and then reversely convert the setting data in text format contained the received set of text data to the original setting data in binary format.

20 Claims, 4 Drawing Sheets (56) References Cited

U.S. PATENT DOCUMENTS

| | | | |
|---|---|---|---|
| 2006/0060066 A1* | 3/2006 | Komano | G10H 1/0008 |
| | | | 84/609 |
| 2009/0164882 A1* | 6/2009 | Bostian et al. | 715/234 |
| 2009/0323938 A1 | 12/2009 | Schneider | |
| 2010/0103450 A1* | 4/2010 | Yanazume | H04N 1/00204 |
| | | | 358/1.15 |
| 2013/0272317 A1* | 10/2013 | Matsumura | 370/467 |

FOREIGN PATENT DOCUMENTS

| | | |
|---|---|---|
| JP | 2004-160687 A | 6/2004 |
| JP | 3726712 B2 | 12/2005 |
| JP | 4766142 B2 | 9/2011 |

OTHER PUBLICATIONS

Notice of Grounds for Rejection mailed Jan. 13, 2015, for JP Application No. 2012-102829, with English Translation, four pages.
European Search Report mailed on Jul. 25, 2013, for European Patent Application No. 13165535.9, seven pages.
Mammen, S. et al. (Nov. 23, 2010). "Design of an Architecture for a MIDI Based Music e-Tutor," Audio Language and Image Processing, (ICALIP), 2010 International Conference on, IEEE, Piscataway, NJ, USA, pp. 682-687.
Notice of Grounds for Rejection (Office Action) mailed Apr. 7, 2015 for Japanese Patent Application No. 2012-102829, with English translation, six pages.
European Communication dated Feb. 21, 2017, for European Patent Application No. 13165535.9, four pages.

* cited by examiner

FACILITATING SHARING OF SETTING DATA IN BINARY FORMAT FOR ELECTRONIC DEVICE

BACKGROUND

The present invention relates to a technique capable of facilitating to share setting data in binary format of a specific format for a specific type of an electronic device between a plurality of devices through a communication network. Particularly, the present invention relates to an electronic device, system, method and computer-readable storage medium capable of realizing such facilitated sharing of setting data.

When a user operates to generate musical sounds or tones from an electronic device such as an electronic musical instrument, the user sometimes wants to generate the musical sounds or tones in the same manner as musical sounds or tones capable of generating by another device. In this case, the user certainly needs to prepare corresponding music data for his or her own device, and furthermore to set up a performance environment that involves various musical performance for controlling the musical sound or tone such as tempo, beat, or effect in the same way as the other device. When the user wants to reflect the performance environment that is set for the other device to the own device, the user have to take a lot of time to set up the similar performance environment to the other device on the own device; however, the set-up operation is very burdensome to the user. Specifically, a beginner user does not know what operation the user needs to begin with.

Thus, a system that can share performance environment setting data for musical sound control between plural devices (also referred to as registration data, and hereinafter merely referred to as "setting data") are known in conventional arts. In the system disclosed in Japanese Patent No. 3726712, which is referred to as "Patent Literature 1" hereinafter, and Japanese Patent No. 4766142, which is referred to as "Patent Literature 2" hereinafter, for example, the user can arbitrarily register (upload) setting data in MIDI format, which is produced on the basis of user's setting of the performance environment, in a server device on a communication network such as the Internet or a local area network (LAN), while the user can selectively retrieve (download) desired setting data from the server device which has been registered by the other users in the server device. Thus, the conventional art accomplishes the sharing of the setting data by transmitting and receiving the setting data in the MIDI data format between plural devices. It is necessary for the server device to be a dedicated server device capable of handling directly setting data in a special format such as MIDI data.

When the user is going to register (upload) the setting data having been set in his or her own device to the dedicated server device or to acquire (download), from the dedicated server device, the setting data having been registered (uploaded) by the other user in the dedicated server device, the user have to have the own device accessible to the dedicated server device. However, the conventional art was based on one-to-one data distribution through the dedicated server device, and therefore the user had to perform the access operation to the dedicated server device such as entry of an ID and a password each time when the user wants to register and/or acquire the setting data, and it was a burdensome task to the user. In addition, the user had to input suitable search criteria by trial and error in order to seek out desired setting data from a number of setting data having been registered in the dedicated server device.

SUMMARY OF THE INVENTION

In view of the foregoing, it is an object of the invention is to provide a technique capable of facilitating to share setting data in binary format of a specific format for a specific type of an electronic device between a plurality of devices through a communication network. Particularly, it is an object of the invention is to provide an electronic device, a system, a method and a computer-readable storage medium capable of realizing such facilitated sharing of setting data with a simple configuration.

In order to accomplish the above-mentioned object, a first aspect of the present invention provides an electronic device, which comprises: a connecting section adapted to connect the electronic device to a server via a communication network, said server providing with a network communication service for managing information exchange using text data between a plurality of user devices connected to the server via the communication network; a converting section adapted to convert original setting data in binary format to setting data in text format, said original setting data in binary format formulated according to a specific format suitable to realize a function in the electronic device; a producing section adapted to produce a set of text data containing at least the setting data in text format converted by the converting section; and a transmitting section adapted to transmit the set of text data produced by the producing section to the server via the connecting section and the communication network.

The electronic device may be an electronic device having an electronic musical generating function such as an electronic musical instrument or the like, and the setting data in binary format for setting a function realized in the electronic device may be data for setting music performance environment and/or sound reproduction tone environment, for example. The network communication service provided on the server adapted to be connected by the electronic device through the connecting section may be an existent (or conventional) network communication service, which is provided through a website, such as a blog service, a microblog service, a social networking service, a web bulletin board service, or the like. The electronic device converts the original setting data in binary format, which is formulated according to the specific format, to the setting data in text format, and transmits the set of text data containing the converted setting data in text format to the server. In this way, a user of the electronic device can easily upload (or transmit) content in general text format, corresponding to the original setting data for the electronic device, to the network communication service provided on the server. Thus, the electronic device according to the first aspect of the present invention has a function of facilitating to upload or transmit the content (containing the setting data in text format) to the network communication service provided on the server. Other users are easily accessible to the content (containing the setting data in text format) uploaded to the network communication service through the communication network. As a result, it is achieved to share easily the setting data in binary format formulated according to a specifial format through the existent (or conventional) network communication service.

Further, in order to accomplish the above-mentioned object, a second aspect of the present invention provides an electronic device, which comprises: a connecting section adapted to connect the electronic device to a server via a communication network, said server providing with a network communication service for managing information exchange using text data between a plurality of user devices connected to the server via the communication network; a reception section adapted to receive a set of text data transmitted by another device, through the connecting section, from the network communication service provided on the server, the set of text data containing at least setting data in text format, the setting data being data for setting a function realized in the electronic device; and a reverse conversion section adapted to reversely convert the setting data in text format contained in the set of text data received by the reception section to original setting data in binary format which is formulated according to a specific format suitable to realize the function in the electronic device.

As mentioned above, the electronic device according to the second aspect of the present invention has a function of downloading (or receiving) content of text data (containing the setting data in text format) from the network communication service provided on the server and reversely-converting the setting data contained in the .downloaded (or received) content of text data to the original setting data in binary format which is formulated according to the specific format. The reversely-converted original setting data in binary format can be used in the electronic device according to the second aspect in such a manner that the original setting data in binary format is reflected in data setting in the electronic device to thereby realize the function set by the original setting data in the electronic device. It should be noted that the both functions of the electronic devices according to the first and second aspects may be incorporated in a single hardware setup of an electronic device.

Accordingly, in the present invention, sharing of the setting data between plural devices, i.e. users, can be accomplished with a simple configuration, and the setting data that is shared in the devices can be easily reflected. In other words, the original setting data in binary format is converted to the setting data in text format, the set of text data is formed with the setting data in text format, and therefore the data distribution of 1:N for data sharing between the own device and the other devices can be realized with the data transmission and reception through the network communication service on a text basis. In addition, according to the data transmission and reception through the existent (conventional) network communication service on the text basis, the user himself or herself does not need to make a special access operation to a dedicated server at every time of registration (upload) or acquisition (download) of the setting data as in the conventional art. Moreover, the network communication service provided on the server may manage a service in which the setting data in binary format uploaded (transmitted) to the network communication service can be transferred or notified, through the communication network, to other devices which have the same function capable of being realized using the setting data in binary format of the specific format. According to such the service, the user does not need to search and seek out the desired setting data from a number of data having been registered on the accessed server device, so that the user can save the tasks.

The electronic device according to the present invention can, of course, be realized by hardware (electronic circuit) such as a digital signal processor (DSP) dedicated to displaying music data and can also be realized in cooperation between a general arithmetic processing device such as a central processing unit (CPU) and a computer program. A program according to the present invention can be provided in a form stored in a non-transitory computer-readable storage medium and can be installed in a computer. The program can also be provided in a form to be delivered via a communication network and can be installed in a computer.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION

Figure 1:
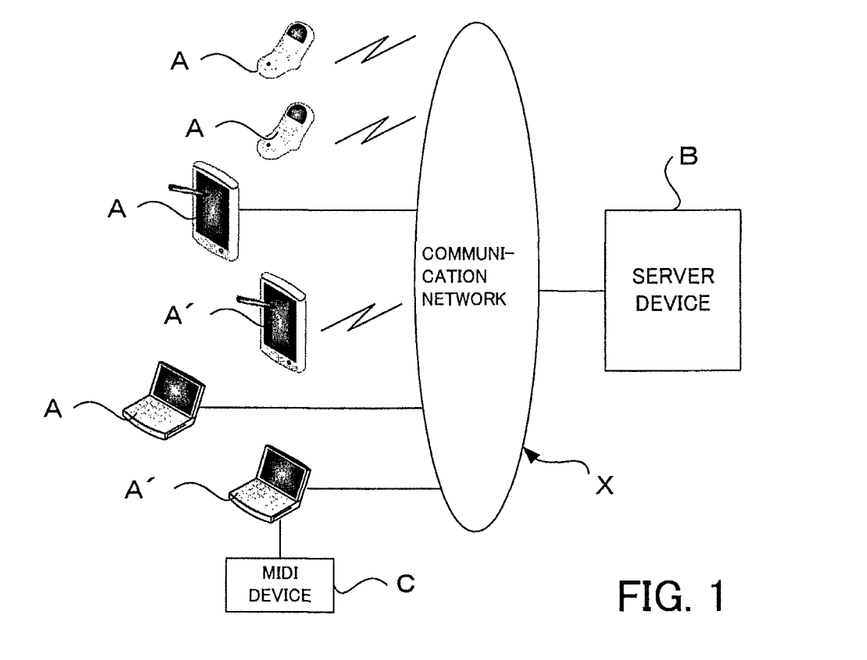
FIG. 1 is a block diagram illustrating an embodiment of an information sharing system to which an electronic device according to the present invention is applied.
Figure 2:
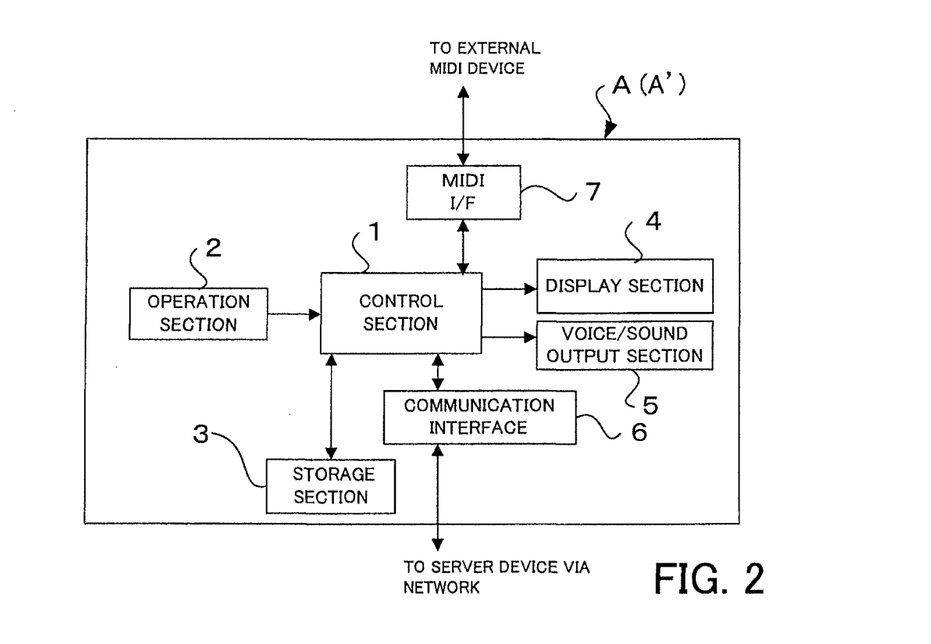
FIG. 2 is a functional block diagram illustrating an embodiment of the electronic device according to the present invention.

FIG. 1 is a system block diagram that shows one example of an information sharing system to which an electronic device according to the present invention is applied. FIG. 2 is a functional block diagram showing an example of a terminal device A capable of functioning as a terminal device A' which is an embodiment of the electronic device according to the present invention. The information sharing system disclosed in the embodiments can share the setting data between plural devices through a communication network X such as the Internet to which an indefinite number of users make access through a network communication service that provides a site for communication where people with the same interests come together for information exchange.

In the information sharing system shown in FIG. 1, a number of terminal devices A (or A') that are used by individual end users and a server device B that provides the network communication service are connected so as to be capable of bi-directionally communicating through an existent communication network X such as a public switched telephone network, the Internet, LAN, etc. The communication network X connecting between those devices is not limited to a wired network but may include a wireless network such as a mobile phone network or a satellite communication link. Furthermore, the information sharing system may have hardware other than that shown in the drawings in some cases; however, the case where minimum resources are used will be described herein. That is, the terminal devices A (or A') and the server device B more than those shown in the drawings may be connected to the communication network X.

A terminal device A (or A') is an electronic device such as a mobile communication terminal including a mobile phone and a PDA, a personal computer, or an electronic musical instrument. The terminal device A (or A') is connected to the communication network X and can make access to the server device B that is identified with a network address such as a URL (communication function). For example, the terminal device A (or A') can download an application program and the like from the server device B in accordance with information input by the user. The terminal device A includes a terminal device A' (such as an electronic musical device) that can handle MIDI data or setting data in binary format according to a specific format peculiar to the device. In the terminal device A', the user himself or herself can set a performance tempo, beat, or sound volume of a clicking sound of the device as performance environment while using the device (performance environment setting function). In this embodiment, the performance environment corresponds to a function that is realized in the electronic device A'.

In addition, while the terminal device A' can perform a process to register (or upload) the setting data of the own device to be shared with the other devices in the server device B, the terminal device A' can also receive (or download) the setting data in the same specific format which has been registered by the other terminal device A' from the server device B and can use the received setting data to set up the performance environment of the own device (sharing function). For example, in the case where the setting data is MIDI data, the terminal device A' sets up the performance environment of the own device according to a MIDI message and based on contents of the message. It should be noted that the setting data is converted to text data to be transmitted and received between the server device B and the terminal device A' in the form of a set of text data in combination with the other text data. The details will be described later.

The set of text data herein means the data that is transmitted and received between the devices in order to accomplish the information exchange between the users through the network communication service and has a concept that includes not only plain text data in which the text data is composed merely with pure characters but also markup language data including various tags (such as HTML or XML), rich text data including format information and the like, and word processor data. In other words, the set of text data, which is different from binary data which may include data unable to express using character codes, is composed only with the data in a form in which humans can interpret and understand all contents of the data, or the data expressed with character codes, and may be in any data format as long as the data is understandable.

The terminal device A' can further transmit the setting data that is produced in response to user's operation for setting the performance environment or acquired from the server device B to an external MIDI device C that is connected through a MIDI interface 7. In other word, the terminal device A' can set up the performance environment not only of the own device but also of the MIDI device C that is directly connected to the own device.

On the other hand, the server device B is a server computer and provides users with a network communication service that accomplishes the information exchange between the users by the transmission and reception of one or more sets of text data between plural devices (user devices) which are connected to the communication network. The network communication service is provided through a website and may be an existent (or conventional) network communication service such as a blog service, a microblog service, a social networking service, and a web bulletin board service, for example. In the network communication service, the server device B manages each terminal device having accessed through the communication network in accordance with a user ID which is input in a log-in. The sharing of the setting data between the terminal devices A' in the present embodiment uses a mechanism of the network communication service that is a kind of an existent communication infrastructure.

The server device B stores one or more sets of text data that is transmitted from each terminal device A (or A'). At the same time, the server device B also stores a reception date and time (referred to as a registration time for descriptive purposes) with the set of text data. Then, for another terminal device A' beginning to connect with the server device B through the communication network X, the server device B retrieves, from among the sets of text data stored (registered) therein up to current time, one or more sets of text data containing setting data of a specific format same as the other terminal device A' on the basis of tag information described later, and distributes the retrieved one or more sets of text data to the other terminal device A' through the communication network X. In addition, when any terminal device A' has registered the set of text data containing setting data in text format according to a specific format to the network communication service provided on the server device B, the server device B distributes the registered set of text data to other terminal devices A' capable of handling the setting data of the same specific format among terminal devices which have already been connected to the server device B through the communication network X.

As shown in FIG. 2, each terminal device A (or A') constituting the information sharing system is configured with an independent computer device which includes control section 1, operation section 2, storage section 3, display section 4, voice/sound output section 5, communication interface 6, and MIDI interface 7. As described above, each terminal device A can transmit and receive the set of text data between the devices through the wired or wireless communication network X and the server device B. The server device B may have almost the same hardware structure as the terminal device A, and therefore its description is omitted herein.

The entire operation of the terminal device A disclosed in this example is controlled by the control section 1 comprising a microprocessor unit (CPU), etc. When the control section 1 receives a user's input for instructing to execute a performance environment setting application (program) from the operation section 2, the control section 1 executes the performance environment setting application that is stored in the storage section 3. A function of setting up the performance environment of the terminal device A itself and a function of sharing the setting data through the network communication service are realized in the terminal device A through the execution of the performance environment setting application (see FIGS. 4 through 7 described below), and therefore the terminal device A can be operated as the aforementioned terminal device A' (e.g., an electronic musical device). In this case, the terminal device A' shares only setting data (binary data) for use in the performance environment setting application with other terminal devices A'.

The operation section 2 includes a run button for instructing the execution of the performance environment setting application, a numerical keypad or a keyboard for inputting text data with characters and numerals such as a song name and user's comments, direction indicator buttons for moving a cursor displayed on the display section 4 in up, down, right, and left directions, and an acceptance button for accepting the process corresponding to displayed contents on a display where the cursor is overlapped. The operation section 2 is not limited to controls that are physically disposed on a main panel but may be virtual controls that are displayed on the display section 4 of a touch panel type. In the present embodiment, the display section 4 of the terminal devices A' comprises a touch panel display, and the virtual controls displayed on the touch panel display function as the operation section 2, accordingly.

The storage section 3 may comprise a ROM, a RAM, a memory card, etc. and may be adapted to store therein various programs such as the performance environment setting application which is executed or referred by the control section 1 and various data such as a device ID peculiar to the device, and temporally store therein various information or data such as the setting data in binary format produced in the electronic device itself and one or more sets of text data containing the setting data in text format of the other device transmitted from the server device B and/or various data which is produced at the time when the control section 1 executes a specified program. The storage section 3 may be an external storage device such as a hard disk unit or a storage device that uses removal external storage media of various types such as a flexible disk (FD), a compact disc (CD), a magnetic optical disk (MO), and a digital versatile disc (DVD). Alternatively, the storage section 3 may be semiconductor memory and the like. Any one set of setting data in binary format can be selected by the user from among a plurality of sets of setting data in binary format for setting the performance environment stored in the storage section 3, in order for setting the performance environment of the electronic device A' itself or uploading it to the network communication service.

The display section 4 is a touch panel display that displays various screens such as a "performance environment setting screen" described later (see FIG. 3) and is constructed with a liquid crystal display (LCD), an organic EL, or an electronic paper, for example. The voice/sound output section 5 is a reproduction device that includes an output device for outputting a user voice which is transmitted and received through the communication network X, a sound source for producing the musical sound based on music data (MIDI data), an amplifier, and a loudspeaker. The sound source receives the MIDI message included in the MIDI data and controls generation of a musical sound or tone according to the contents of the MIDI message.

The communication interface 6 is adapted to be connected with the communication network X such as the LAN, the Internet, and the telephone network and is a communication interface for connecting to the server device B through the communication network X, transmitting the setting data of the own device to the server device B, and receiving the setting data of the other device and the application program which executes various processes from the server device B. The communication interface 6 is not limited to the wired type but may be the wireless type. Furthermore, the communication interface 6 may include both types. Thus, the communication interface 6 functions as a connecting section that is adapted to connect the electronic device A' to the server device B via the communication network X), wherein the server device B provides users with the network communication service for managing information exchange using text data between a plurality of user devices connected to the server device B via the communication network X.

The MIDI interface 7 is a MIDI data communication interface for connecting to an external MIDI device C, acquiring the setting data and the MIDI data such as the music data from the external MIDI device C, or outputting the MIDI data to the external MIDI device C.

It should be understood that the terminal device A may be constructed not only as a single device incorporating the operation section 2, the storage section 3, etc. into its main body but also as an aggregate of separate devices in which the individual sections 2, the storage section 3, etc are connected with each other by using a predetermined interface.

Figure 3:
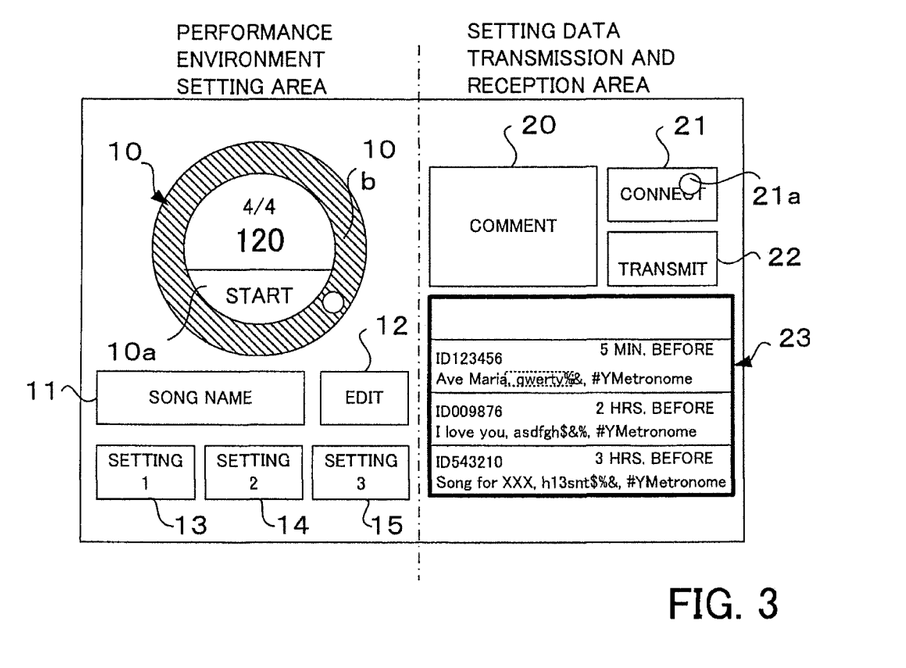
FIG. 3 is a schematic view of a performance environment setting screen displayed in the electronic device.

Next, a screen structure of the "performance environment setting screen" that is displayed in the display section 4 of the terminal device A in accordance with the execution of the performance environment setting application in the terminal device A and an overview of user's operation to the screen will be described with reference to FIG. 3. As shown in FIG. 3, the performance environment setting screen is generally divided into a performance environment setting area for set-up of the performance environment of the own device by the user and a setting data transmission and reception area for registration/acquisition of the setting data that is shared with the other devices through the network communication service by the user.

In the performance environment setting area that occupies a left half of the screen in FIG. 3, a performance environment setting control 10 that artificially simulates an electronic metronome for example is displayed. The user can use the performance environment setting control 10 to set up the performance environment such as a tempo of tone reproduction, a beat or time, etc. In the center of the performance environment setting control 10, the tempo ("120" in the example of the drawing) and the beat or time ("4/4" in the example of the drawing) set in the device currently are displayed. Below this information, a "Start" button 10a is arranged. Each time the user touches the "Start" button 10a, a metronome in the displayed tempo and time is started or stopped. An outer ring of the performance environment setting control 10 shown with hatched lines in the drawing is a control 10b that simulates a dial, and the user can quicken or slow the tempo through a swiping operation or a dragging operation of the control 10b to either side in a circumferential direction.

Individual setting data stored in the storage section 3 is given with an arbitrary name (i.e., a song name), and the song name given to the individual setting data is displayed in a song name input/display field 11. The user can list the setting data already stored in the storage section 3 in the song name input/display field 11 and specify any setting data from the list to read out from the storage section 3. In response to the readout of the specified setting data, the setting of the performance environment is changed based on the read-out setting data, and therefore the value of the tempo or the time displayed in the performance environment setting control 10 is also changed in conjunction with the change of the setting.

An "Edit" button 12 is for editing the song name, for example, giving a song name to new setting data or changing the song name. When the user operates the "Edit" button 12 to enable the edit, the song name input/display field 11 is enabled to input a song name, and the user can input a song name to be allotted to the new setting data within the song name input/display field 11. In addition, the user can change the song name allotted to the arbitrary setting data and displayed in the song name input/display field 11. When the user operates the "Edit" button 12 to turn off the edit, the song name displayed currently in the song name input/display field 11 is allotted to the setting data, and the setting data that reflects the current performance environment displayed in the performance environment setting area is stored in the storage section 3.

The setting data is data in binary format that is described in byte units in accordance with the specific format and can be performed on a computer and the like and stored in the storage section 3 as MIDI format data (or data in a specific format peculiar to the performance environment setting application) for example. Generally, the MIDI format data (more particularly, the MIDI message) and the data in the specific format can be used only in the electronic musical instrument supporting the MIDI format or the device in which the application supporting the specific format is installed. The setting data can be created and edited not only with a dedicated software such as the performance environment setting application program described later (see FIG. 4) or a music sequencer but also with a binary editor for editing hexadecimal binary data, for example; however, the setting data in binary format can be hardly created and edited with a text editor.

The "Setting" buttons are buttons to be operated for various settings, and the "Setting 1" button 13 allows to display a tap tempo screen (not shown), for example. The "Setting 2" button 14 allows to display a beat/time setting screen (not shown). The "Setting 3" button 15 allows to display a volume setting screen for the clicking sound (not shown). In the case where those screens are displayed, the tempo, the beat/time, and the volume of the clicking sound are set in accordance with the appropriate operation to the screens executed by the user. There may be provided with other various setting items than the aforementioned setting items (Setting 1-3) by modifying a figure and size of a virtual control displayed on the performance environment setting area to another one, e.g., a figure of a virtual ten-key pad or slider, in order for enabling a desired tempo or the like to be set using the virtual ten-key pad or slider.

In the setting data transmission and reception area that occupies a right half of the screen in FIG. 3, a comment input field 20, a "Connect" button 21, a "Transmit" button 22, and a time line display area 23 are provided. The comment input field 20 is an area for inputting any comments on the shared setting data by the user. For example, when the user touches the comment input field 20, a keyboard for inputting characters (not shown) is separately displayed on the screen, and the user can use the displayed keyboard to input the comments in the comment input field 20.

The "Connect" button 21 is for displaying and setting a connecting condition to the server device B via the communication network X. Indicator 21a provided on the "Connect" button 21 is lit while the connection with the server device B is maintained. In the case of wireless connection, a display (lighting) style of the indicator 21a may be varied with a condition of radio propagation. In response to a depression of the "Connect" button 21, a connection setting menu (not shown) for selecting various actions related to the connection setting is displayed so that the user can set a desired connection setting such as cutting-off the connection with the communication network X or changing the server device B to be connected.

The "Transmit" button 22 is for registering (uploading) the setting data of the electronic device to the server device B through the communication network X. When the "Transmit" button 22 is depressed, the setting data corresponding to the performance environment currently set in the electronic device is acquired from the storage section 3, converted into data in text format, and transmitted to the server device B. In such case, the setting data is transmitted to the server device B as the set of text data that includes the text data containing strings such as a specific user ID (or a device ID) registered in the server device B in advance, a song name displayed in the song name input/display field 11 (that is, a song name allotted to the setting data), comments entered into the comment input field 20, and tag information (identification data) as the information for identifying a model of the device capable of handling the setting data in the same specific format (refer to the transmission process described later). Regarding the aforementioned tag information, information that is associated with the activated performance environment setting application in advance is automatically imparted to the setting data as the tag information.

The time line display area 23 displays a plurality of sets of text data transmitted (uploaded) to the network communication service provided on the server device B in a form of a list listing the plurality of sets of text data in a time sequence. In this embodiment, the plurality of sets of text data each containing setting data to be shared with the other devices capable of handling the setting data in binary format of the same specific format are displayed with character strings in the time serial order of registration (the set of text data uploaded from the electronic device itself may also be displayed). A set of text data which is more newly registered is displayed in an upper position in the display area 23. During the connection is currently made between the electronic device and the server device B, each time new setting data is registered (uploaded) from another device capable of handling the setting data in binary format of the same specific format to the server device B, the display area 23 additionally displays the newly-registered setting data. Whether the setting data registered from the other device to the server device B is in the same specific format or not is determined based on the tag information that is automatically imparted to the setting data at the time of registration of the setting data. In other words, the tag information is for determining a target device to which the setting data should be transferred through the network communication service.

In addition, the display area 23 displays, other than the setting data, the user ID, display based on the registered time, the song name, the tag information, the comment, and the like by the character strings. In a displayed example at the top in the display area 23 shown in FIG. 3, the string "ID123456" corresponds to the user ID, the string "5 min. before" corresponds to the display based on the registered time, the string "Ave Maria" corresponds to the song name, the string "qwerty %&" enclosed in a dotted frame in the drawing corresponds to the setting data that is converted to text data (also encrypted), and the string "#YMetronome" corresponds to the tag information. The present embodiment is not limited to the above, and the display area 23 may not display the setting data converted to text data or the tag information. In this way, in the present embodiment, the set of text data posted (uploaded) by the user contains not only the setting data in text format which is impossible for a human to read or interpret but also related information readable or interpretative to a human, such as a song name and comments, so that another user received it can easily judge content or substance of the received setting data in text format from display on the display area 23 based on the related information.

When the string at any display column that is displayed in the display area 23 is touched by the user in order to select the string, a performance environment such as a tempo, beat/time, etc. will be set in the terminal device based on the setting data in text format which is contained in the set of text data as a source of the string touched by the user. At that moment, because the performance environment such as the tempo, beat/time, etc. cannot be set in the terminal device if the setting data kept in text format, the setting data in text format should be reversely converted to the MIDI data or other binary data in a special format peculiar to the performance environment setting application (refer to the selection process described later). Using the binary data that is obtained through the reverse conversion, the performance environment such as the tempo, beat/time, etc. is set in the device. A center section of the performance environment setting control 10 displays the set values of the tempo and the time, and the song name input/display field 11 displays the song name contained in the set of text data.

Figure 4:
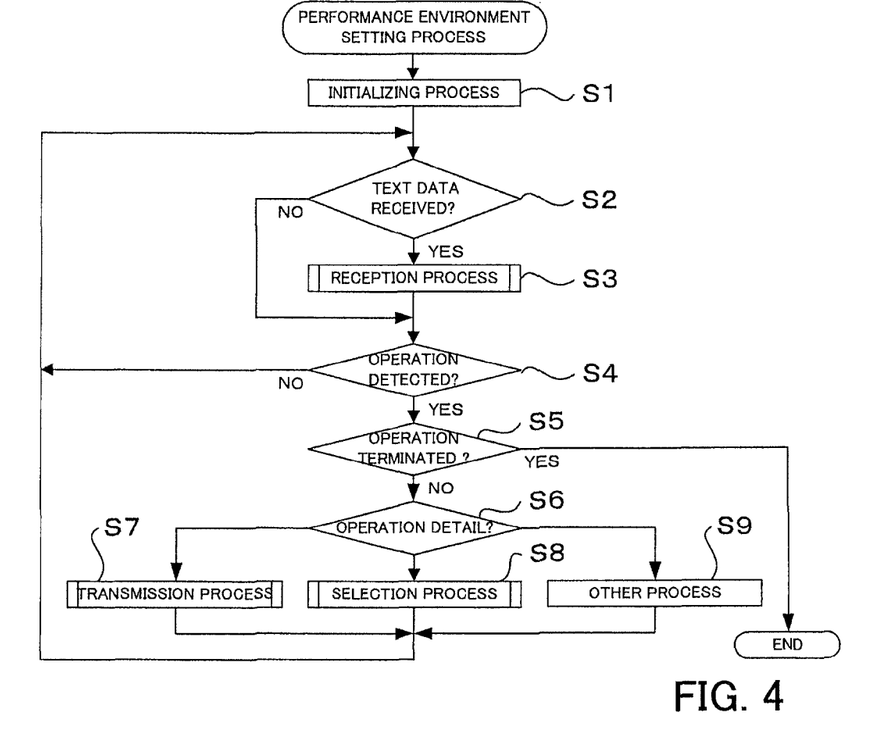
FIG. 4 is a flowchart showing an example of a performance environment setting process performed in the electronic device.

In this embodiment, the sharing of the performance environment setting data between the devices having the setting data in the same specific format is accomplished by using the network communication service which is provided by the server device B. Here, the "performance environment setting process" that is conducted by the terminal device A is described with reference to FIG. 4. FIG. 4 is a flowchart that shows one example of the "performance environment setting process" that is conducted by the terminal device A. The process is executed by the performance environment setting application program that is started on the terminal device A shown in FIG. 1 if needed. The program is kept in a specified standby state at all times after the startup, and performs various processes in accordance with the user operation.

In step S1, an initializing process is executed. The initializing process includes the processes of displaying the "performance environment setting screen" (see FIG. 3) in the display section 4 and clearing the working memory in the storage section 3. In step S2, it is determined whether the set of text data is received or not from the server device B providing with the network communication service and connected with the electronic device through the communication network X.

One example of a reception procedure of a text file containing the setting data may be performed by a transmitting service through the network communication service responsive to a user's request at the time of connection of a terminal device A' to the server device B. Namely, such a transmitting service may be served for users that, when a terminal device A' is connected to the server device B or when the server device B has acknowledged a terminal device A as a terminal device A' based on starting of running of the performance environment setting application on the terminal device A, the server device B transmits to the terminal device A' all setting data (sets of text data) having previously uploaded to the network communication service from other devices capable of handling the setting data in binary format according to the specific format same as the terminal device A'. In this case, the terminal device A' transmits the tag information that is the identification data as the search criteria to the server device B at every opportunity of connection. The server device B searches, based on the tag information transmitted from the terminal device A', for all setting data (the sets of text data) having previously uploaded to the network communication service from other devices capable of handling the setting data in binary format according to the specific format same as the terminal device A', extracts the searched-out setting data (sets of text data) and transmits the extracted setting data (sets of text data) to the connected terminal device A'. In other words, at the start of the connection between the terminal device A' and the server device B, the server device B transmits the corresponding setting data in response to a data acquisition request from the terminal device A'.

Another example of the reception procedure of the text file containing the setting data may be performed in response to periodic data acquisition requests from the terminal device A'. Namely, the server device B may receive the periodic data acquisition requests from the terminal device A' that has already been connected to the network. When setting data is newly registered from an other device (another terminal device A') capable of handling the setting data in binary format of the specific format same as the terminal device A' having issued the request, the server device B transmits only the newly registered setting data to the terminal device A' having issued the data acquisition request.

Further example of the reception procedure of the text file containing the setting data may be performed in response to a user's operation. Namely, the user may log in the network communication service provided on the server device B through the terminal device A' and receive (download) desired setting data from the network communication service selected by user's operation.

The reception procedure aforementioned is performed by the control section 1 (CPU) of the terminal device A' based on a computer program not shown in detail. At the step S2 in FIG. 4, it is determined whether the text file containing any setting data in text format is received or not as a result of the reception procedure performed by the control section 1.

Thus, the control section 1 executing a program of the reception procedure and step S2 functions as a reception section adapted to receive a set of text data transmitted by another device, through the connecting section, from the network communication service provided on the server device B, the set of text data containing at least setting data in text format, wherein the setting data is data for setting a function realized in the electronic device A'.

When the determination is made that the set of text data is not received from the server device B (NO in the step S2), the process jumps to the process of step S4. On the other hand, when the determination is made that the set of text data is received from the server device B (YES in the step S2), the "reception process" S3 is executed. Although the details of the process are described later (see FIG. 5), a list of one or more sets of text data that is registered in the server device B is displayed in the display area 23 on the "performance environment setting screen" in the time serial order of registration through the execution of the reception process S3.

In the step S4, it is determined whether some kind of user operation about the "performance environment setting screen" (see FIG. 3) is detected or not. In the case where the determination is made that the user operation is not detected (NO in the step S4), the process returns to the step S2. In the case where the determination is made that the user operation is detected (YES in the step S4), it is determined whether the detected user operation is to terminate the process such as closing of the screen or not (step S5). In the case where the determination is made that the detected user operation is a terminate operation (YES in the step S5), the process is terminated, and the display of the performance environment setting screen exits.

On the other hand, in the case where the determination is made that the detected user operation is not the terminate operation (NO in the step S5), the details of the operation on the performance environment setting screen by the user is determined, and the process is assigned to each detected operational detail by the user (step S6). In the case where the user operation is an operation on the "Transmit" button 22, the "transmission process" is executed (step S7). In the case where the user operation is a touch operation on the string at any display column that is displayed in the display area 23, the "selection process" is executed (step S8). In the case where the user operation is the operation other than the above, the "other process" that is associated with each operation is executed (step S9).

The "other process" includes a process of starting or stopping the metronome in the tempo and the beat/time in display when the user operation is the operation on the "Start" button 10, a process of permitting the edit of the song name when the user operation is the operation on the "Edit" button 12, and a processing of setting the tempo, the beat/time, and the volume when the user operation is the operation on the various "Setting" buttons 13 through 15, for example. In addition, when the user operation is the operation on the comment input field 20, the process is a write acceptance process, and when the user operation is the operation on the "Connect" button 21, the process is of displaying the connection setting menu on the screen. After the execution of any process in the steps S7 through S9, the process returns to the process of the step S2, and the processes in the steps S2 through S9 described above are repeated until the user performs the terminate operation.

Figure 5:
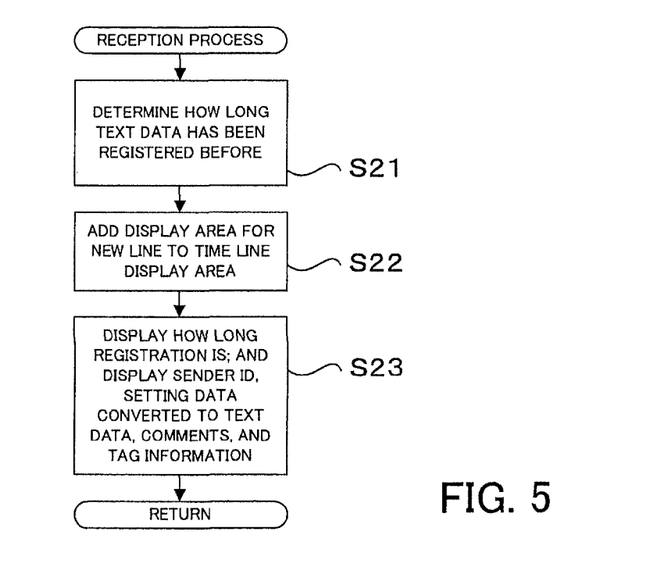
FIG. 5 is a flowchart showing a detailed example of a reception process in the performance environment setting process.

Next, the reception process (see step S3 in FIG. 4) is described. FIG. 5 is a flowchart that shows one example of the reception process. In step S21, it is determined based on the registered information how long the received set of text data has been registered in the server device B before from the present. In step S22, the display area for displaying a new line is added to the display area 23. In step S23, in addition to the display of how long the determined registration is, the user ID (sender ID), the song name, a text of the setting data in text format, and the tag information that are contained in the set of text data are displayed in the added display area. Accordingly, the new line is added and displayed in the display area 23.

Figure 6:
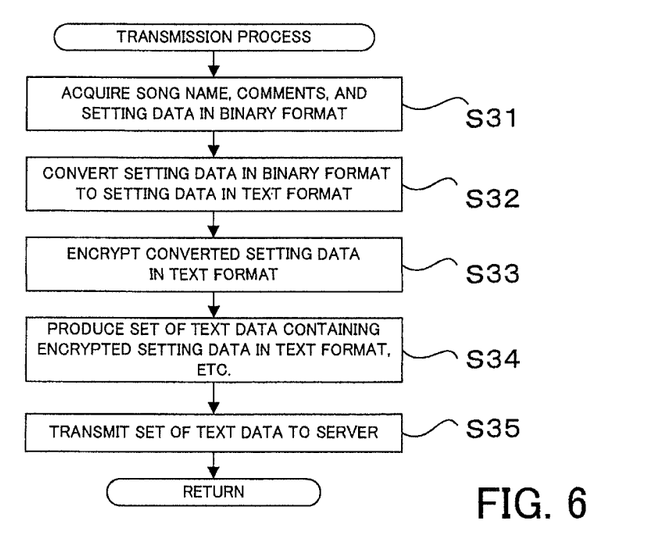
FIG. 6 is a flowchart showing a detailed example of a transmission process in the performance environment setting process.

The transmission process (see the step S7 in FIG. 4) is described. FIG. 6 is a flowchart that shows one example of the transmission process. In step S31, the song name, the comments, and the setting data in binary format that are entered or selected from the "performance environment setting screen" (see FIG. 3) through the user operation are acquired from the storage section 3. In step S32, the setting data in binary format acquired at the step S31 (i.e., original setting data in binary format) is converted to text data (i.e., setting data in text format). After the process, the setting data in binary format is treated as setting data in text format (the setting data converted to text data) comprising character strings such as "Tempo 120.34, Beat 4-4, Mix 10,8,5,5".

Thus, the control section 1 (CPU) executing a program of the step S32 functions as a converting section adapted to convert original setting data in binary format to setting data in text format, wherein the original setting data in binary format has been formulated according to a specific format suitable to realize a function in the electronic device A'. Also, the control section 1 (CPU) executing a program of the step S31 functions as an acquisition section adapted to acquire the original setting data in binary format to be transmitted.

In step S33, the converted setting data in text format is encrypted. The setting data converted to text data is represented by the character string, and therefore the modification of the contents is easily done in comparison with the setting data in binary format. In other words, because the setting data converted to text data is in the format which is readable and easily understood by the user, the contents of the setting data are rewritten in the process of sharing, and therefore there is a greater risk that the data may improperly be used for the different purpose from the original intention. Thus, in order to prevent the above risk, it is preferred that the setting data converted to text data is encrypted. The mechanism of the encryption and decryption described later may be any well-known mechanisms, and therefore the description is omitted herein. The setting data may be encrypted first and then converted to text data. In addition, the setting data may be compressed and then encrypted and converted to text data.

In step S34, a set of text data containing the encrypted setting data in text format, unencrypted song name, unencrypted comments, and unencrypted tag information (i.e., identification data) is produced. In step S35, the set of the text data that is produced is transmitted to and registered in the server device B. In conjunction with the registration of the set of text data, the set of text data that is registered is transmitted from the server device B to the other device having the setting data in the same specific format, and according to this, the new line is added and displayed in the time line display area 23 on the "performance environment setting screen" (see FIG. 3) (refer to the steps S2 and S3).

Thus, the control section 1 (CPU) executing a program of the steps S33 and S34 functions as a producing section adapted to produce a set of text data containing at least the setting data in text format converted by the converting section. Also, the control section 1 (CPU) executing a program of the step S35 functions as a transmitting section adapted to transmit the set of text data produced by the producing section to the server B via the connecting section and the communication network X.

Figure 7:
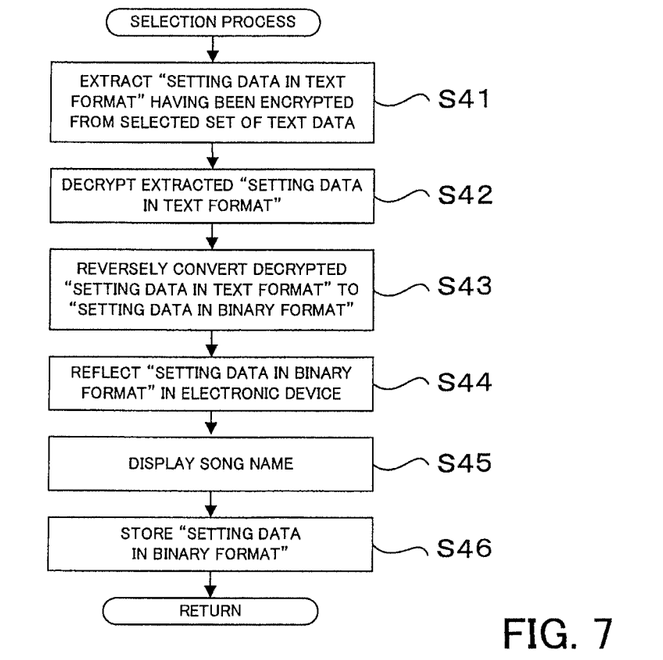
FIG. 7 is a flowchart showing a detailed example of a selection process in the performance environment setting process.

The selection process (see the step S8 in FIG. 4) is described. FIG. 7 is a flowchart that shows one example of the selection process. In step S41, the set of text data corresponding to the character string to which the user touches from among the sets of text data received from the server device B is specified (namely, one set of text data is selected by the user), and then the setting data in text format having been encrypted is extracted from the specified (selected) set of text data. In step S42, the identified setting data in text format having been encrypted is decrypted. In step S43, the decrypted setting data in text format is converted reversely to setting data in binary format (i.e., the original setting data in binary format) through a reverse conversion process. In step S44, the device setting is performed based on the reversely-converted setting data in binary format. Namely, the reversely-converted setting data in binary format is reflected in data setting in the electronic device A' to thereby realize the function based on the setting data in the electronic device A'. In step S45, the song name contained in the set of text data is displayed in the song name input/display field 11 on the "performance environment setting screen" (see FIG. 3). In step S46, the reversely-converted setting data in binary format is stored in the storage section 3.

Thus, the control section 1 (CPU) executing a program of the steps S41, S42 and S43 functions as a reverse conversion section adapted to reversely convert the setting data in text format contained in the set of text data received by the reception section to original setting data in binary format which is formulated according to a specific format suitable to realize the function in the electronic device. Also, the control section 1 (CPU) executing a program of the step S44 functions as a data reflecting section adapted to reflect the original setting data in binary format reversely-converted by the reverse conversion section in data setting in the electronic device A' to thereby realize the function in the electronic device A'.

As described above, the setting data in binary format for musical sound control between plural terminal devices A' connected to the communication network X which is produced in accordance with the specific format is converted to plain text, and the set of text data containing the setting data converted to text data is transmitted and received through the network communication service. The network communication service that accomplishes the information exchange between network users is formed on the communication network X, and the network communication service is provided by the transmission and the reception of the set of text data between the plural devices connected to the communication network by the server device B. In an embodiment, the server device B may transfer the set of text data transmitted from a device to the other device capable of handling the setting data in binary format of the same specific format.

Thus, the terminal device A' is connected to the server device B so as to be capable of transmitting and receiving the data, produces the set of the text data containing the setting data converted to text data in which the setting data in binary format is converted to text data, and transmits the set of the text data. On the other hand, the terminal device A' to which the set of the text data transmitted by the other device having the setting data in the same specific format is transferred from the server device B reversely converts the setting data converted to the text data contained in the set of text data into the setting data in binary format and restores to the original format when receiving the set of the text data. By reconverting to the binary format, the setting of the performance environment for controlling the musical sound can be performed by using the setting data.

According to the embodiment as described above, the setting data in binary format that is produced in accordance with the specific data format (standard) is converted to the plain text setting data, and the identification data is given to the setting data, so that the data is transmitted and received between a number of the devices on a network through the network communication service on a text basis. Therefore, individual user can share the setting data for intended uses with a simple configuration. In addition, the user him or herself does not need to make an access operation on the server device B in each registration or acquisition of the setting data as in the conventional art, and further does not need to search and seek desired setting data from a number of data that are registered in the accessed server device B. In other words, the shared setting data can be reflected easily. Further, the setting data in text format contained in the set of text data is encrypted so that the setting data can be prevented from modification, and improper use of the setting data by a third party who is not a user of the product, i.e., the performance environment setting application program, can be prevented also. It should be noted that the encrypted setting data in text format can be decrypted by the performance environment setting application program. Therefore, to encrypt the setting data in text format facilitates to limit in such a manner that the received (downloaded) setting data can be used only by an owner of the performance environment setting application program because the received (downloaded) setting data cannot be used unless it is decrypted by the performance environment setting application program running on the terminal device A (namely A').

Although an example of the embodiments is described with reference to the drawings so far, it is understood that the present invention is not limited to the above and various embodiments can be carried out. For example, the network communication service that is provided by the server device B is not limited to the above. As one example, assuming a network community is formed on the communication network as a place for sharing information where only preliminarily-registered users can participate, a service in which the setting data (the set of text data described above) registered by the user belonging to the same community is transferred to the other user belonging to the same community (more particularly to the device to which the user is logging in) or a service in which the setting data registered by the specific user is transferred to the other user interesting in the specific user (regardless of whether the user belongs to the same community or the other community) may be provided. In this case, the user may specify the affiliate community or the specific user through the input of the tag information, or each user may register the information such as the affiliate community or interesting specific user on the server device in advance.

The display area 23 may change the display form of the string (for example, shading or changing of display color) based on the searching result in which the registered music data in the storage section 3 is searched by using the song name contained in the received set of text data and whether the storage section 3 has the matched music data or not. In the case where the music data given with the same song title as the song name is not stored in the storage section 3, the setting data may be made unselectable. Furthermore, in the case where the music data given with the same song title as the song name is stored in the storage section 3, the device setting may be performed depending on the selection of the setting data, and the matched music data may be read out and may automatically start to play.

In addition, it should be understood that the selected setting data may immediately be reflected to the music being played when the setting data is selected from the display area 23 during the play of the music.

The setting data is not limited to the above but may be timbre or a rhythm mixer value (sound volume value for each note), for example. In addition, the examples described above indicate the sharing of the setting data in MIDI format, but the present invention is not limited to the above. For example, the musical sound control data such as the music data in MIDI format may be shared, or the musical sound control data in binary format other than the MIDI format may be shared. Furthermore, the present invention is applied not only to such the setting of the electronic musical instruments but also to the setting of various electronic devices such as an exercise setting in an exercise equipment, the setting of brightness or a color in video devices (e.g. an imaging device such as a camera and a player device, and a video mixer device), a visual effect setting, and various settings of video game device.

The tag information (identification data) contained in the set of text data that is transmitted to the server device B may be information about a creator or a user of the shared data, information on the electronic device that can use the shared data, information about the environment where the shared device setting is used (such as music, sound, exercise, image, visual effect, game), for example. Those tag information may be set such that the user can enter the tag information corresponding to the above information from the comment input field 20, for example. It should be noted that the display section 4 may not be of the touch panel type.

This application is based on, and claims priority to, JP PA 2012-102829 filed on 27 Apr. 2012. The disclosure of the priority application, in its entirety, including the drawings, claims, and the specification thereof, are incorporated herein by reference.

What is claimed is:

1. A first electronic device, comprising:
   a connecting section adapted to connect the first electronic device to a server via a communication network, said server providing a network communication service for managing information exchange using text data between a plurality of second electronic devices connected to the server via the communication network;
   a reception section adapted to receive one or more sets of text data transmitted by one or more of the second electronic devices, through the connecting section, from the network communication service provided on the server, each of the one or more sets of text data containing at least:
      respective setting data in text format, the respective setting data being data for setting a respective function that was previously realized in the respective second electronic device, and
      a respective character string in text format, the respective character string indicating the respective function that was previously realized in the respective second electronic device;
   a display section adapted to display at least one or more respective character strings of the received one or more sets of text data so that one or more respective functions that were previously realized in one or more respective second electronic devices are indicated to a user;
   an operation section operable by the user to select a set of text data from the displayed list; and
   a processing unit configured to reversely convert the setting data in text format contained in the selected set of text data to original setting data in binary format which is formulated according to a specific format suitable to realize the respective function, which was previously realized in the respective second electronic device, in the first electronic device.

2. The first electronic device according to claim 1, which further comprises a data reflecting section adapted to reflect the original setting data in binary format reversely-converted by the processing unit in data setting in the first electronic device to thereby realize the respective function, which was previously realized in the respective second electronic device, in the first electronic device.

3. The first electronic device according to claim 1, wherein the display section is adapted to display the one or more sets of text data in the list in a time serial order of registration in the network communication service.

4. The first electronic device according to claim 1, wherein the setting data in text format contained in the set of text data received from the network communication service is encrypted.

5. The first electronic device according to claim 1, wherein said original setting data in binary format is setting data for a music performance.

6. The first electronic device according to claim 5, wherein said setting data for a music performance is data for setting a music element selected from among a group of music elements including at least tempo, beat, and tone volume.

7. A non-transitory computer-readable storage medium containing a group of instructions executable by a processor of a first electronic device to cause the first electronic device to perform a method, the method comprising the steps of:
   connecting the first electronic device to a server via a communication network, said server providing a network communication service for managing information exchange using text data between a plurality of second electronic devices connected to the server via the communication network;
   receiving one or more sets of text data transmitted by one or more user of the second electronic devices, through the step of connecting, from the network communication service provided on the server, each of the one or more sets of text data containing at least:
      respective setting data in text format, the respective setting data being data for setting a respective function that was previously realized in the respective second electronic device, and a respective character string in text format, the respective character string indicating the respective function that was previously realized in the respective second electronic device;
   displaying at least one or more respective character strings of the received one or more sets of text data so that one or more respective functions that were previously realized in one or more respective second electronic devices are indicated to a user, each of the received one or more sets of text data containing its respective setting data for setting its respective function in the electronic device;
   selecting, via the user's operation on one or more user-operable controls of the first electronic device, a set of text data from the displayed list; and reversely converting the setting data in text format contained in the selected set of text data to original setting data in binary format which is formulated according to a specific format suitable to realize the respective function, which was previously realized in the respective second electronic device, in the first electronic device.

8. The non-transitory computer-readable storage medium according to claim 7, wherein the method further comprises a step of reflecting the original setting data in binary format reversely-converted by the step of reversely-converting in data setting in the first electronic device to thereby realize the respective function, which was previously realized in the respective second electronic device, of the respective setting data of the selected set of text data in the first electronic device.

9. The non-transitory computer-readable storage medium according to claim 7, wherein said original setting data in binary format is setting data for a music performance.

10. The non-transitory computer-readable storage medium according to claim 9, wherein said setting data for a music performance is data for setting a music element selected from among a group of music elements including at least tempo, beat, and tone volume.

11. A system comprising:
   a server adapted to provide with a network communication service for managing information exchange using text data between a plurality of transmission electronic devices connected to the server via a communication network;
   one or more of the transmission electronic devices, each comprising a respective processor configured to:
   convert respective original setting data in binary format to respective setting data in text format, said respective original setting data in binary format formulated according to a specific format suitable to realize a respective function in the specific type of the respective transmission electronic device, the respective function previously realized in the respective transmission electronic device;

produce a respective set of text data containing at least the converted setting data in text format; and transmit the produced set of text data to the network communication service provided on the server; and a second reception electronic user device comprising:
a processor configured to:
receive one or more sets of text data transmitted by the one or more transmission electronic devices from the network communication service provided on the server each of the one or more sets of text data containing at least:
respective converted setting data in text format, the respective converted setting data being data for setting the respective function that was previously realized in the respective transmission electronic device, and
a respective character string in text format, the respective character string indicating the respective function that was previously realized in the respective transmission electronic device;
a display configured to display at least one or more respective character strings of the received one or more sets of text data so that one or more respective functions that were previously realized in one or more respective transmission electronic devices are indicated to a user;
one or more user-operable controls operable by a user to select a set of text data from the displayed list, the selected set of text data containing its respective converted setting data for setting its respective function in the reception electronic device,
wherein the processor of the reception electronic device is configured to reversely convert the converted setting data in text format contained in the selected set of text data to the respective original setting data in binary format suitable to realize the respective function, which was previously realized in the respective transmission electronic device, in the reception electronic device.

12. The system according to claim 11, wherein at least one of the first transmission and reception electronic devices is the specific type of the electronic device.

13. The system according to claim 11, wherein said original setting data in binary format is setting data for a music performance.

14. The system according to claim 13, wherein said setting data for a music performance is data for setting a music element selected from among a group of music elements including at least tempo, beat, and tone volume.

15. The system according to claim 11, wherein said one or more user-operable controls are physically disposed on a panel of the reception electronic device or are virtual controls that are displayed on the display.

16. A first electronic device, comprising:
a communication interface configured to connect the first electronic device to a server via a communication network, said server providing a network communication service for managing information exchange using text data between a plurality of second electronic devices connected to the server via the communication network;
a processor configured to receive one or more sets of text data transmitted by one or more of the second electronic devices, through the communication interface, from the network communication service provided on the server, each of the one or more sets of text data containing at least:
respective setting data in text format, the respective setting data being data for setting a respective function that was previously realized in the respective second electronic device, and
a respective character string in text format, the respective character string indicating the respective function that was previously realized in the respective second electronic device;
a display configured to display at least one or more respective character strings of the received one or more sets of text data so that one or more respective functions that were previously realized in one or more respective second electronic devices are indicated to a user; and
one or more user-operable controls operable by a user to select a set of text data from the displayed list,
wherein the processor is configured to reversely convert the setting data in text format contained in the selected set of text data to original setting data in binary format which is formulated according to a specific format suitable to realize the respective function, which was previously realized in the respective second electronic device, in the first electronic device.

17. The first electronic device according to claim 16, wherein the processor is configured to reflect the original setting data in binary format reversely-converted by the processor in data setting in the first electronic device to thereby realize the respective function, which was previously realized in the respective second electronic device, in the first electronic device.

18. The first electronic device according to claim 16, wherein said original setting data in binary format is setting data for a music performance.

19. The first electronic device according to claim 18, wherein said setting data for a music performance is data for setting a music element selected from among a group of music elements including at least tempo, beat, and tone volume.

20. The first electronic device according to claim 16, wherein said one or more user-operable controls are physically disposed on a panel of the first electronic device or are virtual controls that are displayed on the display.

* * * * *